United States Patent [19]

Sasaki et al.

[11] Patent Number: 4,748,566
[45] Date of Patent: May 31, 1988

[54] ENGINE CONTROL APPARATUS

[75] Inventors: Shoji Sasaki; Kenji Tabuchi, both of Katsuta, Japan

[73] Assignee: Hitachi, Ltd., Tokyo, Japan

[21] Appl. No.: 753,855

[22] Filed: Jul. 11, 1985

[30] Foreign Application Priority Data

Jul. 11, 1984 [JP] Japan .................................. 59-142366

[51] Int. Cl.⁴ .......................... G05B 9/02; F02D 28/00
[52] U.S. Cl. ................................ 364/431.11; 364/551; 123/479; 73/117.3
[58] Field of Search ........................... 364/431.11, 551; 123/479; 73/117.3

[56] References Cited

U.S. PATENT DOCUMENTS

| 4,386,427 | 5/1983 | Hosaka | 364/431.11 |
| 4,444,048 | 4/1984 | Nitschke et al. | 73/117.3 |
| 4,532,594 | 7/1985 | Hosaka et al. | 364/431.11 |
| 4,580,220 | 4/1986 | Braun et al. | 364/431.11 |

FOREIGN PATENT DOCUMENTS 0108847  6/1984  Japan .............................. 364/431.11

*Primary Examiner*—Parshotam S. Lall
*Attorney, Agent, or Firm*—Antonelli, Terry & Wands

[57] ABSTRACT

A main computer which furnishes main engine control signals to initiate a predetermined operation of an internal combustion engine, outputs a monitoring signal whose state changes between a high and a low levels at predetermined intervals. The monitoring signal is watched by a main computer monitor, which maintains its output at a high level during repetition of the change of state in the monitoring signal and, in absence of the change of state in the monitoring signal, changes the state of its output between the high and a low levels at intervals longer than that of the monitoring signal. A backup computer which furnishes auxiliary engine control signals to initiate the minimum operational condition of the engine, monitors the output of the main computer monitor to detect a malfunction or abnormal operation of the main computer. When the number of the changes of state in the output of the main computer monitor exceeds a predetermined value, the malfunction of the main computer is judged to be serious so that the backup computer provides a switching request signal. Under the condition of existence of the switching request signal and that the backup computer is properly operating, switching from the main to the backup computer takes place.

10 Claims, 3 Drawing Sheets

ENGINE CONTROL APPARATUS

BACKGROUND OF THE INVENTION

1. Field of the Invention

The present invention relates to an engine control apparatus for an internal combustion engine, and more particularly to an improvement of an engine control apparatus which has two computing means, one for main engine control signals and the other redundantly provided for auxiliary engine control signals, in which switching from the main to the auxiliary engine control signals is made when the computing means for the main engine contol signals is not properly operating.

2. Description of the Related Art

A conventional apparatus of such a kind as described above is known from U.S. Pat. No. 4,444,048, for example. In the known apparatus, a main computer furnishes main control signals for an internal combustion engine to initiate a predetermined operation, in accordance with the engine operating parameters then sensed by various sensors which are installed in the engine and peripheral devices and equipment thereof, and an auxiliary computer operates only upon malfunction of the main computer and furnishes auxiliary control signals for the engine, i.e. signals which are simple so as to allow the minimum operation of the engine until such time as the next repair station can be reached.

There is further provided a switching circuit, whereby switching from the main to the auxiliary computer takes place if any error or malfunction in the main computer occurs. For this purpose, the main computer provides a monitoring signal as well as the main engine contol signals. The monitoring signal is a signal which indicates whether or not the main computer is properly operating. An error detector always monitors the monitoring signal, and outputs a switching signal to the switching circuit when the error detector detects an error, e.g., the absence of the monitoring signal indicative of correct operation of the main computer. Further, the auxiliary computer is monitored by means of a test program executed within the main computer.

In this way, in the known system the main computer is monitored by the error detector and the auxiliary computer is monitored by the main computer. However, no consideration is given to failure of the error detector itself, so that the reliability of the system as a whole is reduced. Further, in the known system, the error detectors of various kinds are composed of so-called wired logic circuits. As a result, the error detector is relatively complicated in its structure and lacks the flexibility to variation of the engine control.

SUMMARY OF THE INVENTION

An object of the present invention is to provide an improved engine control apparatus which is able to achieve the high reliability of a system as a whole by making it possible to monitor not only a malfunction or abnormal operation in the main computer, but also any error or malfunction in a monitor for monitoring the main computer.

According to one of the features of the present invention, there are provided a first computer means which furnishes main engine control signals in dependence on the engine operating parameter signals and produces a monitoring signal indicating its own operational condition, as well as a second computer means for providing auxiliary engine control signals by which the engine is controlled during the malfunction or abnormal operation of the first computer means. A first computer monitoring means receives the monitoring signal from the first computer means and produces a malfunction detecting signal when a malfunction or abnormal operation is detected, and the malfunction detecting signal is watched by the second computer means, which outputs a switching request signal in response to appearance of the malfunction detecting signal. Switching from the main to the auxiliary engine control signals is executed under the condition of existence of the switching request signal and that the second computer means is properly operating.

According to the feature mentioned above, the malfunction or abnormal operation of the first computer means is detected, through the first computer monitoring means, by the second computer means, which, in the known apparatus, functions only for the purpose of furnishing the auxiliary engine control signals. As a result, the second computer means monitors the operation of the first computer monitoring means. Accordingly, the reliability of a system as a whole is improved, compared with the known engine control apparatus.

If there is further provided a monitoring means for the second computer means, the reliability of the system is improved much more.

The features which we desire to protect herein are pointed out with particularity in the appended claims. The invention itself, together with further objects and advantages thereof may best be understood by reference to the following description taken in connection with the accompanying drawings.

DESCRIPTION OF THE PREFERRED EMBODIMENT

Figure 1:
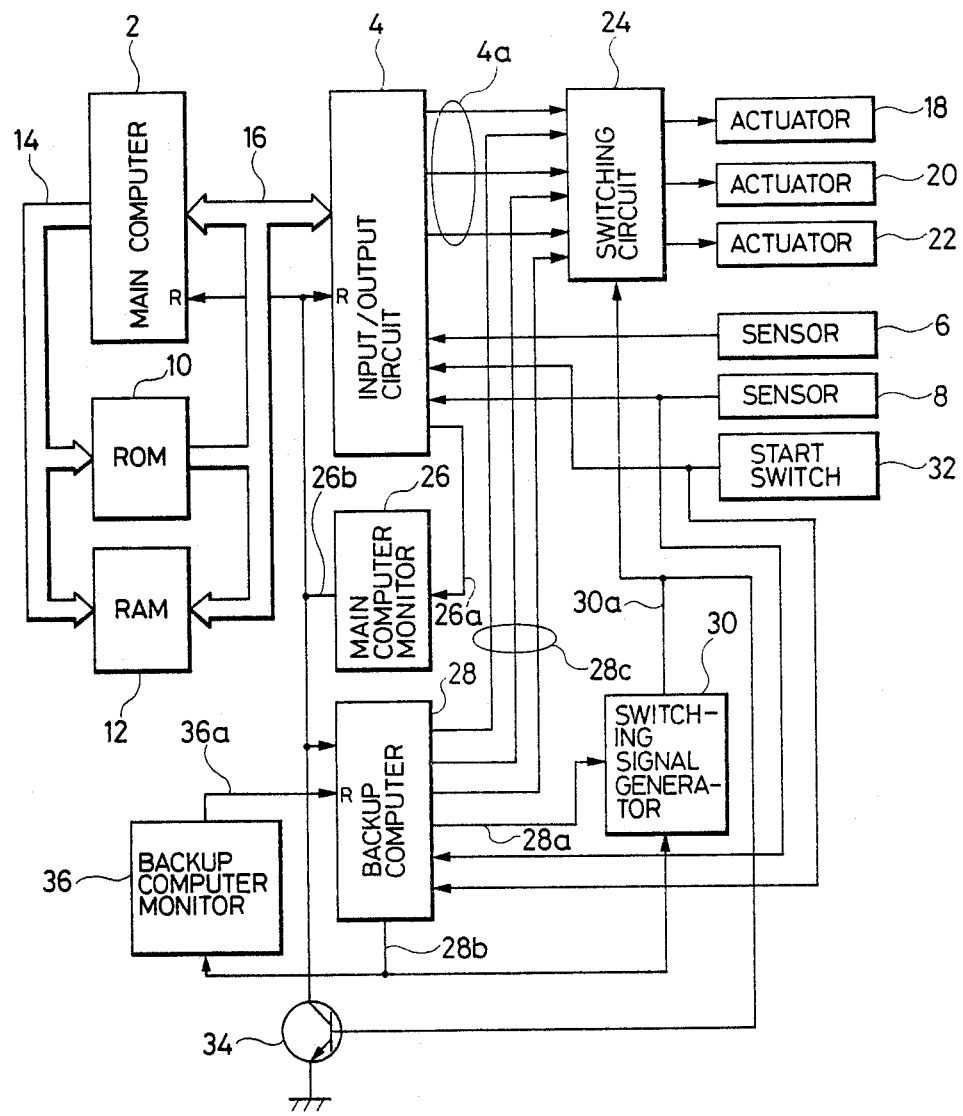
FIG. 1 shows an engine control apparatus according to an embodiment of the present invention.

Referring to figures, the explanation will be made of an embodiment of the present invention hereinafter. In FIG. 1, first of all, a main computer 2 introduces, via an input/output circuit 4, various signals of engine operating parameters representing an operational condition of an internal combustion engine to be controlled. These signals are obtained from various kinds of sensors installed in the engine itself and the peripheral devices and equipment thereof. In the figure, there are provided an air flow sensor 6 which measures the amount of the air taken in by the engine and a rotational sensor 8 which generates pulses corresponding to angular positions of a crank shaft of the engine in synchronism with the rotation thereof. These two operating parameters are most fundamental for the engine control, however other parameters as are usually knwon well, such as the temperature of a cooling water, the opening degree of a throttle valve, the control position of a transmission etc., can be also taken into consideration.

Based upon the introduced signals as mentioned above, the computer 2 calculates and determines main engine control signals, e.g. the rate of fuel supply to the engine, the ignition timing and so on. For this purpose, the computer 2 is connected to a read-only memory (ROM) 10 in which a program for the above mentioned calculation and determination is stored, to a random access memory (RAM) 12 which stores the data necessary for execution of the program and the data calculated by the running of the program and to the input-/output circuit 4, via an address bus 14 and a data bus 16.

The data calculated by the thus connected computer 2, such as the amount of fuel injection and the timing of ignition as mentioned above, are sent, via a switching circuit 24, from the input/output circuit 4 to various actuators as the engine control signals. As the actuators, in this embodiment there are provided an actuator 18 for a fuel supply device, an actuator 20 for an ignition control device, and an actuator 22 for a fuel pump. These actuators 18 to 22 function in response to the corresponding signal, so that a predetermined operation of the engine is initiated. It is to be noted here that the kinds of the sensors and the actuators are determined in accordance with the concept of the engine control required. Therefore, the combinations of the sensors, the actuators, and the elements connected between them can vary in order to satisfy the required concept of the engine control.

Figure 2:
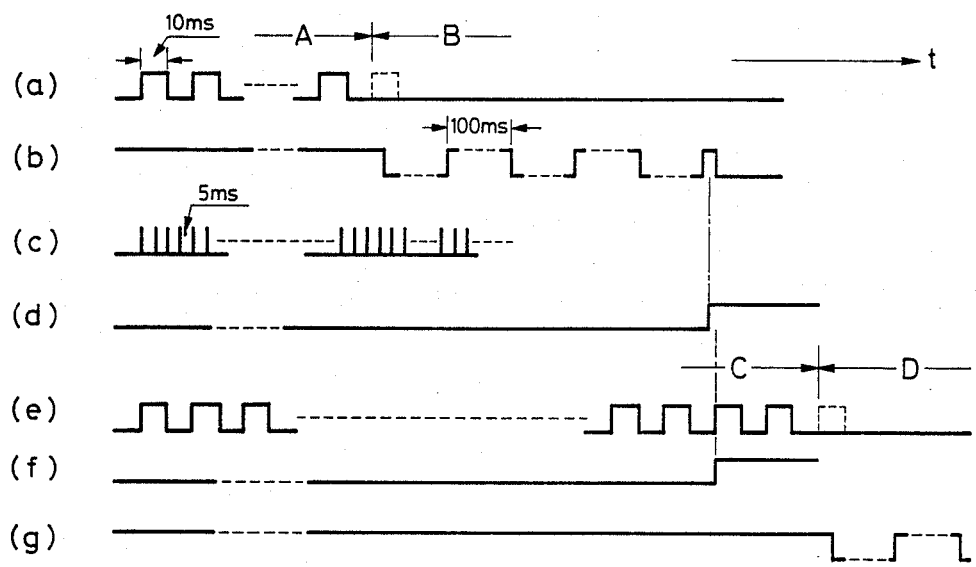
FIGS. 2(a)–2(g) show timing charts for explaining the operation of the apparatus shown in FIG. 1.

The computer 2 produces a signal indicative of its being under the in a normal operation, when the proram is running properly. This signal is sent to a main computer monitor 26 as a monitoring signal 26a, via the input/output circuit 4. When the computer 2 is operating normally, the monitoring signal 26a changes its state between a high and a low levels at predetermined intervals, as shown in the region A of FIG. 2 (a). In this embodiment, the time of the interval is set equal to 10 msec.. If the computer 2 malfunctions or exhibits abnormal operation, the change of state in the monitoring signal 26a disappears or the interval of the change of state is elongated, as shown in the region B of FIG. 2 (a). Therefore, the malfunction or abnormal operation of the computer 2 can be detected by watching the change of state of the monitoring signal 26a.

When the malfunction or abnormal operation has been found from watching the monitoring signal 26a, the monitor 26 initiates a change of state in its output signal 26b. As shown in FIG. 2(b), the signal 26b is kept at a high level during existence of the change of state in the monitoring signal 26a, and changes its state between a high and a low levels at predetermined intervals when the change of state in the monitoring signal 26a disappears. The time interval of the change of state in the signal 26b is equal to 100 msec. in this embodiment, i.e., by ten times longer than that in the monitoring signal 26a.

Figure 5:
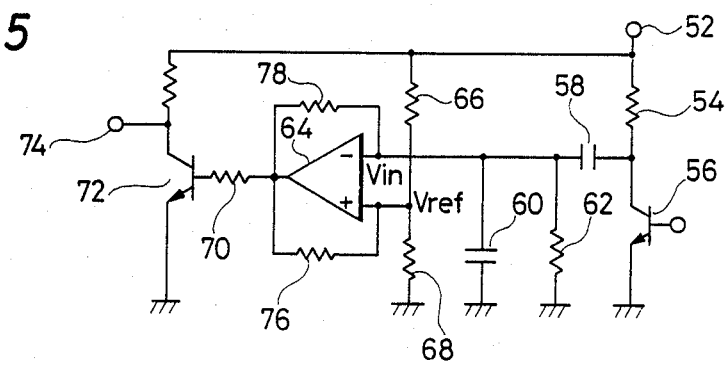
FIG. 5 shows an example of the detailed circuits of a computer monitor used in the apparatus of FIG. 1.

The main computer monitor 26 is shown in FIG. 5 in detail. Referring to FIG. 5, a transistor 56 is connected between a power source 52 and ground via a resistor 54, and receives the monitoring signal 26a at a base electrode thereof. When the computer 2 is working properly, the transistor 56 receives repeated pulses through the base thereof and is rendered conductive or nonconductive repeatedly. Consequently, the electric charge of a capacitor 58 is discharged or charged repeatedly. When the transistor 56 is nonconductive, the electric current determined by the quantity of charge discharged from the capacitor 58 in a previous cycle flows from the power source 52 into a capacitor 60 through the resistor 54 and the capacitor 58 to electrically charge the capacitor 60. Therefore, the terminal voltage of the capacitor 60 rises. When the computer malfunctions, the transistor 56 is maintained at one of either the conductive or nonconductive state. A terminal voltage Vin of the capacitor 60 assumes the low level whether the transistor 56 is conductive or nonconductive.

The terminal voltage Vin is input to a comparator 64. Further, a constant voltage Vref determined by resistors 66 and 68 is input to a comparator 64 which compares the voltage Vin with the voltage Vref. When the computer 2 is working properly, the voltage Vin is high, i.e., Vin>Vref, and the comparator 64 produces a low level output. This signal passes through a resistor 70 and renders a transistor 72 nonconductive so that a high level signal appears at an output terminal 74 thereof. If the computer 2 is malfunctioning, the terminal voltage Vin of the capacitor 60 drops, so that Vin<Vref. The comparator 64 then produces a high level output. The output of the comparator 64 is applied to the resistor 68 via a resistor 76, so that the voltage Vref is raised to Vref 1. The output of the comparator 64 electrically charges the capacitor 60 via a resistor 78 to raise the voltage Vin. The comparator 64 continues to produce the high level output until the voltage Vin becomes higher than the voltage Vref 1, and the transistor 72 is rendered conductive. As a result the terminal 74 assumes the low level voltage.

As the terminal voltage Vin of the capacitor 60 becomes greater than the voltage Vref 1, the comparator 64 produces the low level output, whereby the voltage Vref 1 returns to the initial voltage Vref, the transistor 72 is rendered conductive, and the terminal 74 assumes the high level voltage. Thus, low level pulses and high level pulses are produced repeatedly from the terminal 74. The signal appearing at the terminal 74 becomes the signal 26b, which functions as a reset signal for the computer 2 and the input/output circuit 4, as described later. Therefore, the signal 26b is called the reset signal hereinafter.

Now referring back to FIG. 1, the reset signal 26b is applied to a backup computer 28 as well as to reset terminals of the main computer 2 and the input/output circuit 4. The backup computer 28 furnishes auxiliary engine control signals 28c on the basis of the signal from the rotational sensor 8. The auxiliary engine control signals 28c are such signals as are sufficient only to allow the minimum operation of the engine until the next repair station can be reached. In this embodiment, the auxiliary engine control signals are composed of signals such as a fuel injection period and an ignition timing which initiate the minimum operational condition of the engine as described above. The detailed explanation of this operation will be made later with reference to FIG. 4. Of course, however, the backup computer 28 may be more complicated.

Further, by monitoring the reset signal 26b the backup computer 28 judges whether or not the malfunction or abnormal operation of the main computer 2 is serious. For this purpose, the backup computer 28 watches the state of the reset signal 26b every 5 msec. for example, as shown in FIG. 2(c). If the reset signal 26b is maintained continuously at one of two levels, e.g. at the high level as in this embodiment, it is judged that the operation of the main computer 2 is proper or normal. When the change of state appears in the reset signal 26b, the backup computer 28 counts the number of times thereof within a predetermined period. If the counted value exceeds a predetermined value, e.g. three, as shown in FIG. 2(b), it is an indication that the main computer 2 has not responded to three reset signals, and so the malfunction or abnormal operation of the main computer 2 is determined to be so serious that the engine control signals should be switched from the signals by the main computer 2 to those by the backup computer 28.

Figure 3:
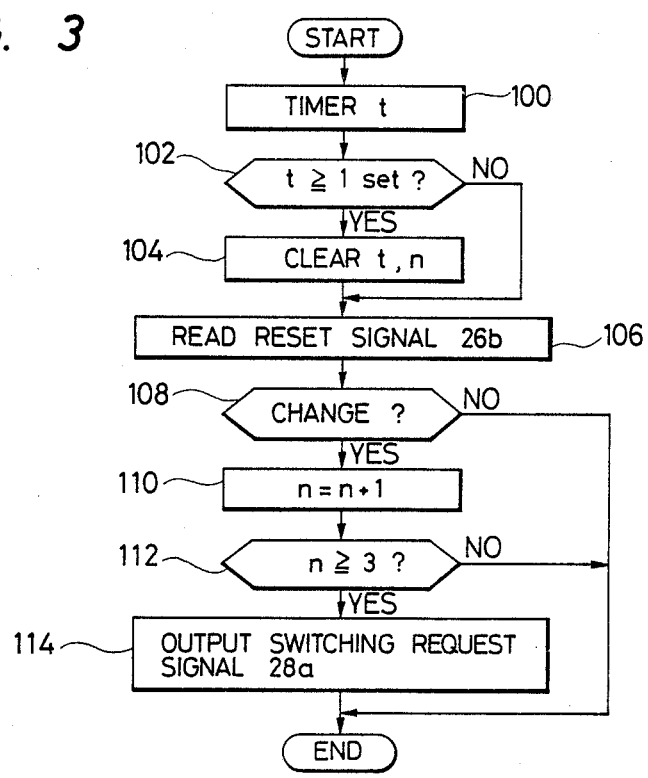
FIG. 3 is a flow chart showing the generating operation of a switching request signal, among the operations of a backup computer in the apparatus shown in FIG. 1.

The operation of the above mentioned judgement within the backup computer 28 will be explained more in detail hereinafter, with reference to FIG. 3. The figure is a flow chart illustrating the method of judging whether or not the malfunction or abnormal operation of the main computer 2 is serious. The program of this flow chart is executed every 5 msec. for example.

When the program starts, a timer counter increments its content by one at a step 100. The increment is made at each of the program, namely the timer counter counts the number of times of the execution of the program. Accordingly, because the program is executed regularly, i.e. every 5 msec., the count of the timer counter represents the time t which has passed since the first increment thereof. At a step 102, it is judged whether or not a predetermined time period elapsed; 1 sec is given as the predetermined time period in this embodiment. If the time elapsed is within 1 sec., the program is jumped to a step 106, so that the reset signal 26b is read into and stored in the backup computer 28.

If, however, the time elapsed exceeds 1 sec., the respective contents t and n of the timer counter and another counter described later are cleared at a step 104, and then the reset signal 26b is read and stored. A step 108 compares the thus stored reset signal with the reset signal that was read and stored in the previous time. If the condition is the same as the previous time, nothing is done and the program is completed. If the condition is changed from the previous condition, a counter that is storing the number of times the reset signal 26b has changed increases its content by one at a step 110. Then, it is judged at a step 112 whether the counted value n is greater than a predetermined value N or not. As is understood from FIG. 2(b), the predetermined value N is set at 3 in this embodiment. If the counted value n is less than 3, nothing occurs and the program goes to end. If, however, the counted value n exceeds 3, the malfunction or abnormal operation of the main computer 2 is determined to be of such a serious extent that the engine control signals have to be switched from the main to the auxiliary control signals. Consequently, the backup computer 28 outputs a switching request signal 28a as shown in FIG. 2(d), and then the program is completed.

In this manner, the switching request signal 28a is not produced immediately upon occurrence of the change of state in the reset signal 26b, but it is output for the first time when the number of the change of state within the predetermined value exceeds the predetermined value. The reason therefor is as follows. If the malfunction or abnormal operation of the main computer 2 is judged to be serious immediately upon the first occurrence of the change of state in the reset signal 26b, it often results in an erroneous judgement or excess switching of the engine control signals. Namely, there is a possibility that, even when the main computer 2 is normally operating, the monitoring signal 26a may take the low level, for example, in the event of an instantaneous failure of a power source or by some other causes, so that the reset signal 26b may start the change of state thereof. Further, when the malfunction or abnormal operation of the main computer 2 is not serious, it is unnecessary to switch the engine control signals from the main to the auxiliary control signals. The main computer 2 may be able to recover just after the reset signal 26b is applied thereto.

Referring back to FIG. 1 again, as the switching signal generator 30, an one-shot multivibrator is used in this embodiment. The switching request signal 28a is applied to a set terminal of the multivibrator 30, which is triggered by a signal 28b from the backup computer 28. Similarly to the monitoring signal 26a, the signal 28b repeats the change of state thereof at predetermined intervals during the normal operation of the backup computer 28, as shown in the region C of FIG. 2(e). The time interval of the repetition is 10 msec. equal to that in the monitoring signal 26a. When the backup computer 28 is malfunctioning, the change of state in the signal 28b disappears or the time interval of the repetition is extended, as shown in the region D of FIG. 2(e).

The multivibrator 30 is brought into the astable condition, when it is triggered by the signal 28b under existence of the switching request signal 28a. Since the time constant of the multivibrator 30 is set longer than the time interval of the signal 28, the multivibrator 30 is maintained at the astable condition once it is triggered. When the multivibrator 30 becomes astable, the switching signal 30a shown in FIG. 2(f) is output to the switching circuit 24. Upon receipt of the switching signal 30a, the switching circuit 24 switches its output signals from the main signal lines 4a to the auxiliary engine control signals 28c. Further, when the switching signal 30a is generated, a transistor 34 turns on to make the reset signal 26b ineffective, as shown in FIG. 2(b), whereby a try to restart the main computer 2 is stopped.

Further, the signal 28b is watched by a backup computer monitor 36, which outputs a reset signal 36a as shown in FIG. 2(g) when the signal 28b indicates the malfunction or abnormal operation of the backup computer 28. The reset signal 36a is applied to a reset terminal of the backup computer 28 whereby the restart of the backup computer 28 is tried.

Figure 4:
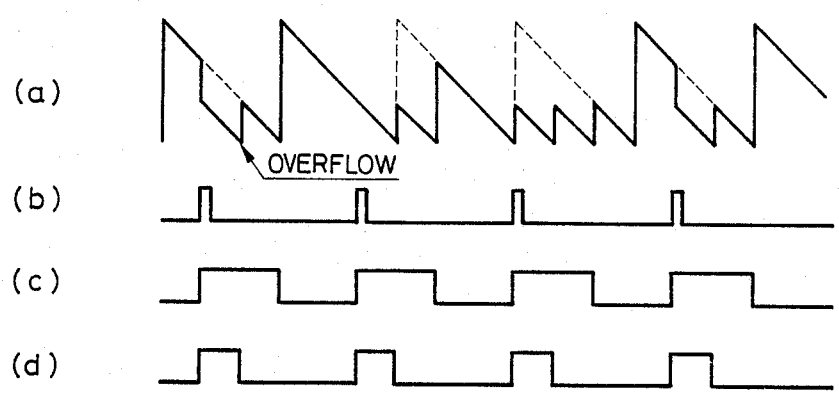
FIGS. 4(a)–4(d) are diagrams showing, among the operations of the backup computer, the operation for generating the engine control signals which allows the minimum operation of the engine.

By the way, the operation of generating the auxiliary engine control signals by the backup computer 28, which was briefly referred to before, will be explained in detail hereinafter, with reference to FIG. 4. The backup computer 28 has a timer which is set to a certain count and counts down at a rate determined by a clock pulse signal. The timer overflows when the set count becomes zero, and the setting of the count is made each time there is an overflow. A signal generated for every overflow is an interrupt signal, which is called a timer interrupt signal. In this embodiment, the period of the timer interrupt signals is selected as about 5 msec.. FIG. 4(a) shows the change of the count of this timer. There is another interrupt signal, i.e. an external interrupt signal, which is generated by the rotational sensor 8, as shown in FIG. 4(b). The external interrupt signal occurs at every certain rotational angle of the engine rotation.

Now, when the external interrupt signal occurs on the way of counting-down of the timer, the timer is reset to a count corresponding to the fuel injection period, that is to say, the content of the timer at that time is replaced by the above mentioned count. The fuel injection period in this case is, as already stated before, the period sufficient only to allow the minimum operational condition of the engine. Further, when the external interrupt signal, i.e. the signal corresponding to the rotational angle of the engine rotation, is generated, an ignition timing signal and an fuel injection period signal are made high, as shown in FIG. 4(c) and (d), respectively.

After the re-setting of the count described above, the timer restarts counting down at the rate determined by the clock signal. When the content of the timer becomes equal to zero, the timer overflows, whereby the fuel injection signal is made low, as shown in FIG. 4(d), to stop the injection of fuel. Namely, the injection is conducted during the high level of the fuel injection signal. Then, a further period necessary for the ignition, i.e. the period from the time when the fuel injection signal becomes low to the time when the ignition is executed, is calculated and the count corresponding to the further period is set into the timer by the overflow interrupt signal. The timer counts down again at the rate determined by the clock signal. When the content of the timer becomes zero. the ignition timing signal is made low, as shown in FIG. 4(c). This means that the current flowing through a primary winding of a known ignition coil during the high level of the ignition timing signal is cut off, so that the ignition is done at that time. After the ignition, the timer is set to the count to be possible at that time.

By repeating the operation as described above, the backup computer 28 furnishes the auxiliary control signals sufficient to maintain the minimum operational condition of the engine, as shown in FIGS. 4(c) and (d). In the auxiliary engine control signals of this embodiment, the amount of the injection of fuel is constant and the timing of the ignition is fixed. However, it is of course that they may be made variable. For example, when a throttle valve is closed, the width of the fuel injection signal is made narrow, that is to say, the amount of the injection of fuel is reduced. To the contrary, the width of the fuel injection signal is widened, when a starter switch operates. Thereby, the more accurate control can be achieved.

Figure 6:
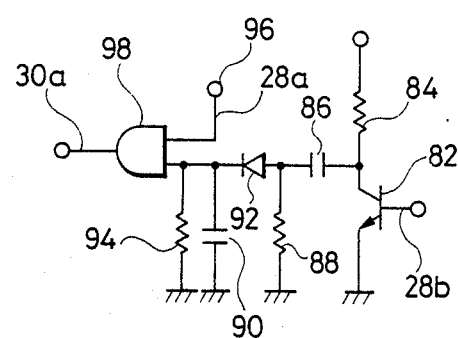
FIG. 6 shows an example of variations of a switching signal generator used in the apparatus of FIG. 1.

Moreover, a variation of this embodiment can be also considered with respect to the switching signal generator 30. In this embodiment, the one-shot multivibrator is utilized as the switching signal generator 30. Other circuits or devices are also available. One of those is shown in FIG. 6. In the figure, a transistor 82, resistors 84, 88, and capacitors 86, 90 operate in the same manner as those of the circuit of FIG. 5. When a normal pulse as the signal 28b, is input to the base of the transistor 82 a high voltage is applied to the terminal of the capacitor 90. Since a diode 92 is provided in this circuit, as compared with the circuit of FIG. 5, the electric charge stored in the capacitor 90 simply discharges through a resistor 94. Therefore, the terminal of the capacitor 90 assumes a higher voltage. As the switching request signal 28a is input from a terminal 96, an AND gate 98 produces a high level signal 30a. As the signal input to the transistor 82 assumes a constant level, no charging current flows from the capacitor 86 to the capacitor 90 and the electric charge stored in the capacitor 90 discharges through the resistor 94. Therefore, a low level signal is input to the AND gate 98. Accordingly, even when the switching request signal 28a is input from the terminal 96, the AND gate 98 does not produce a high level output, i.e., does not produce the switching signal 30a.

Although we have herein shown and described only one form of apparatus embodying our invention, it is understood that various changes and modifications may be made therein within the scope of the appended claims without departing from the spirit and scope of our invention.

What is claimed is:

1. A control apparatus for internal combustion engines having sensing means for providing signals of engine operating parameters representative of operational conditions of an internal combustion engine, comprising:

first computer means for outputting main engine control signals in dependence on the engine operating parameter signals from said sensor means and a first monitoring signal indicating the operational condition of said first computer means;

second computer means for outputting auxiliary engine control signals by which the engine is to be controlled during malfunction of said first computer means;

actuating means responsive to either the main or the auxiliary engine control signals to initiate a predetermined operation of the engine; and switching means connected to receive outputted signals from said first and second computer means for supplying to said actuating means the main engine control signals in the absence of receipt of a switching signal and the auxiliary engine control signals upon receipt of a switching signal; wherein said second computer means includes means responsive to said first monitoring signal indicating a malfunction of said first computer means for producing a switching request signal and a second monitoring signal representing the operational condition of said second computer means; and further including switching signal generating means for applying a switching signal to said switching means in response to receipt of the switching request signal and the second monitoring signal from said second computer means.

2. An engine control apparatus as defined in claim 1, wherein said first computer means is connected to receive said malfunction detecting signal as a restart signal to initiate the restart of operation of said first computer means.

3. An engine control apparatus as defined in claim 2, wherein an input/output means is further provided through which the transmission of the engine operating parameter signals between said first computer means and said sensing means and of said main engine control signals to said switching means is conducted, and wherein said input/output means is reset by the malfunction detecting signal.

4. An engine control apparatus as defined in claim 3, wherein the monitoring signal of said first computer means is a signal which repeats a change of state thereof periodically at a predetermined interval, and the malfunction detecting signal is a signal capable of taking first and second states having different values, and which is maintained at one of the states during repetition of the change of state in the monitoring signal of said first computer means and, in the absence of repetition, repeats the change of state between the two states periodically at intervals longer than those of the monitoring signal of said first computer means.

5. An engine control apparatus as defined in claim 4, wherein said second computer means produces said switching request signal only when a predetermined number of repetitions of the change of state in the malfunction detecting signal occurs within a certain time.

6. An engine control apparatus as defined in claim 4, wherein the change of state in the malfunction detecting signal is stopped when the switching signal is generated.

7. An engine control apparatus as defined in claim 6, wherein there is further provided second computer monitoring means for monitoring said second monitoring signal and for initiating a restart of operation of said second computer means when said second monitoring signal indicates a malfunction of said second computer means.

8. A control apparatus according to claim 1, further including first computer monitoring means responsive to said first monitoring signal for producing a malfunction detecting signal when a malfunction of said first computer means is detected from said first monitoring signal, and wherein said switching request signal producing means in said second computer means is responsive to said malfunction detecting signal for producing said switching request signal and said second monitoring signal.

9. A control apparatus for an internal combustion engine comprising:
   first computer means for producing main engine control signals and a first monitoring signal indicating the operational condition of said first computer means;
   second computer means for producing auxiliary engine control signals by which the engine is to be controlled during malfunction of said first computer means;
   actuating means responsive to either the main engine control signals or the auxiliary engine control signals for controlling predetermined operations of the engine;
   first computer monitoring means connected to receive said first monitoring signal to produce a malfunction detecting signal when a malfunction of said first computer means is detected from said first monitoring signal; and
   switching means for normally connecting said actuating means to said first computer means and for switching connection of said actuating means from said first computer means to said second computer means in response to receipt of a switching signal; wherein
   the malfunction detecting signal produced by said first computer monitoring means is a signal which continuously takes one of first and second states during the normal operation of said first computer means and repeatedly changes between one and the other of said first and second states at a predetermined interval when a malfunction of said first computer means is detected; and wherein
   said second computer means includes means for producing a switching request signal when a repetition of the change in state of the malfunction detecting signal occurs more than a predetermined number of times and a second monitoring signal representing the operational condition of said second computer means; and further comprising
   switching signal generating means for applying a switching signal to said switching means in response to receipt of said switching request signal and said second monitoring signal from said second computer means.

10. A control apparatus according to claim 9, wherein said first monitoring signal is a signal which repeats a change of state thereof periodically at a predetermined interval which is shorter than the interval of said malfunction detecting signal.

* * * * *